United States Patent [19]

Baker

[11] Patent Number: 4,592,684

[45] Date of Patent: Jun. 3, 1986

[54] METHOD AND APPARATUS FOR PRODUCING ASPHERICAL SURFACES

[75] Inventor: Lionel R. Baker, Orpington, United Kingdom

[73] Assignee: Sira Limited, Chislehurst, United Kingdom

[21] Appl. No.: 756,573

[22] Filed: Jul. 19, 1985

Related U.S. Application Data

[63] Continuation of Ser. No. 477,804, Mar. 22, 1983, abandoned.

[30] Foreign Application Priority Data

Mar. 22, 1982 [GB] United Kingdom ............... 8208277

[51] Int. Cl.$^4$ ............................................... B23C 3/04
[52] U.S. Cl. ................................. 409/132; 51/33 W; 51/284 R; 82/16; 82/12; 409/199
[58] Field of Search ................. 409/80, 84, 104, 115, 409/122, 123, 131, 191, 200, 204, 291, 292, 293; 82/16, 12; 51/33 W, 284 R

[56] References Cited

U.S. PATENT DOCUMENTS

| | | | |
|---|---|---|---|
| 2,539,941 | 1/1951 | Allen | 82/12 X |
| 2,725,776 | 12/1955 | Hopkins | 82/12 X |
| 3,139,083 | 6/1964 | Seidel et al. | 82/12 X |
| 3,763,597 | 10/1973 | Schlotfeldt | 82/12 X |
| 3,842,713 | 10/1974 | Hamilton et al. | 51/284 X |
| 3,881,378 | 5/1975 | Bettiol | 82/12 X |
| 4,083,272 | 4/1978 | Miller | 82/12 |
| 4,264,249 | 4/1981 | Dawson | 82/12 X |
| 4,333,368 | 6/1982 | Watt | 82/12 X |
| 4,375,739 | 3/1983 | Machida et al. | 82/12 X |
| 4,535,566 | 8/1985 | Soper et al. | 51/33 W X |

FOREIGN PATENT DOCUMENTS

| | | | |
|---|---|---|---|
| 636042 | 4/1950 | United Kingdom | 82/12 |
| 2062510 | 5/1981 | United Kingdom | 82/12 |
| 0688289 | 9/1979 | U.S.S.R. | 82/12 |

Primary Examiner—Gil Weidenfeld
Assistant Examiner—Glenn L. Webb
Attorney, Agent, or Firm—Sughrue, Mion, Zinn, Macpeak and Seas

[57] ABSTRACT

A method and apparatus for producing an aspherical surface, for example, an aspherical optical surface, on a workpiece, on which the workpiece is rotated about a first axis, a cutting tool is rotated about a second axis, and at a radial distance from the second axis, and the second and first axes meet at a point and at an angle with respect to one another, the second axis being moved with respect to the first axis so that the point moves along the first axis and the angle changes.

5 Claims, 6 Drawing Figures

METHOD AND APPARATUS FOR PRODUCING ASPHERICAL SURFACES

This is a continuation of application Ser. No. 477,804, filed Mar. 22, 1983 abandoned.

BACKGROUND OF THE INVENTION

The present invention provides a method and apparatus for producing aspherical surfaces.

Aspherical surfaces are widely used, particularly in optics with respect to lens and reflective surfaces. They have hitherto often been produced by rotating a workpiece of material about a first axis and using a forming tool to produce the aspheric surface. The method is diagrammatically illustrated in FIG. 1 which shows a cross section in the X-Y plane through a workpiece 10 of material in which the surface 11 is to be formed. The forming tool 12 starts from a point 0 on the axis of rotation of the workpiece 10 and moves away from this point along a locus to produce, in combination with the rotation of the workpiece 10, the desired surface 11. The movement of the tool 12 requires a combination of linear movements in the X direction and in the Y direction and requires very sophisticated control of movement of the cutting tool 12 in the two linear directions. At all times the tool 12 must be moving in the direction of a tangent to the curve as is illustrated in FIG. 1. The direction of motion of the tool 12 at two points, P1 and P2 as the surface 11 is generated is indicated by lines T1 and T2 and the resultant motions in the X and Y direction RX1, RY1 at point P1 and RX2, RY2 at point P2 are shown.

The control of such resultant linear movements which are not constant to the very fine tolerances required by optical apparatus is very difficult. The apparatus is therefore expensive to manufacture and must be carefully operated and properly maintained if sufficient accuracy is to be achieved.

SUMMARY OF THE INVENTION

The present invention provides a method for producing an aspherical surface on a workpiece comprising rotating the workpiece about a first axis, rotating a surface forming member, which may be in the form of a cutting tool, about a second axis and at a radial distance therefrom to form a surface thereon, the second axis and first axis meeting at a point and being at an angle with respect to one another, and moving the second axis with respect to the first axis so that the point moves along the first axis and the angle changes.

The present invention also provides a method for producing an aspherical surface on a workpiece comprising rotating the workpiece about a first axis, rotating a surface forming member in contact with the workpiece about a second axis and at a radial distance therefrom, the circumference of the locus traced out by the surface forming member at all times passing through a predetermined point on the first axis and rotating the plane of said locus about said predetermined point to form an aspherical surface on the workpiece. The predetermined point about which the plane of the path rotates forms the pole of the surface. A particular advantage of this arrangement is that all movements have been translated into rotational movements which are easily achieved and accurately controlled by means of rotational bearings and rotary motors.

The rotation about the two axes is preferably controlled so that the workpiece is rotated about the first axis at a considerably greater speed of rotation than the rotation about the second axis.

The invention also provides an apparatus for carrying out the method of the invention comprising means for mounting a workpiece, said mounting means including means to rotate the workpiece about a first axis, means for mounting a surface forming member, means for rotating the surface forming member about a second axis at a radial distance from that second axis, the second axis and first axis being arranged to meet at a point and at an angle and means being provided to relatively move the second axis and the first axis so that said point moves along the first axis and the angle changes, thereby to produce an aspherical surface.

The invention also provide an apparatus for carrying out the method of the invention, comprising means for mounting a workpiece, means for rotating said workpiece about a first axis, means for mounting a surface forming member, means for rotating the surface forming member about a seond axis at a radial distance from that second axis to thereby trace out a locus, the circumference of the locus at all times passing through a predetermined point on the first axis and means for rotating the plane of said locus about said predetermined point.

BRIEF DESCRIPTION OF THE DRAWINGS

A preferred embodiment of the invention will now be described by way of example only and with reference to the accompanying drawings in which, FIG. 1, already described, shows diagrammatically a prior art method for producing an aspherical surface.

DETAILED DESCRIPTION OF THE PREFERRED EMBODIMENTS

Figure 2:
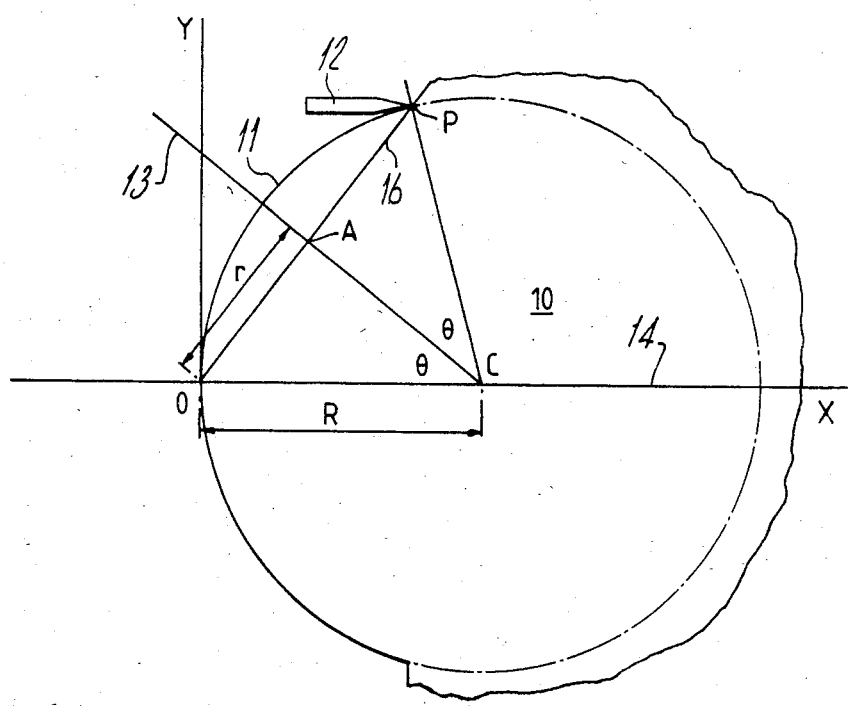
FIGS. 2 to 4 illustrate the geometry on which the present invention is based.

The invention to be described relies on the geometrical principle illustrated with respect to FIG. 2. In FIG. 2, the workpiece is illustrated as before by reference 10, the surface produced is illustrated by reference 11. The workpiece 10 is rotated about the axis through the origin 0 which forms the pole of the surface 11. The Z axis is directly out of the paper through the origin 0. Consider a single point contact surface forming tool 12 mounted so as to rotate about the axis 13 at a distance r from the axis 13 so as to sweep out a circle 16, the axis 13 being at an angle $\theta$ to the axis of rotation 14 of the workpiece 10, and the radius r being chosen so that the circumference of the circle 16 passes through the origin 0. The two axes 13, 14 intersect at C. Assume that the tool 12 starts at the origin 0 and slowly moves around the circumference of the circle 16 to the position P shown in FIG. 2. If the rotation of the workpiece 10 about its axis 14 is sufficiently rapid, the cutting tool 12 will cut a spherical surface 11 of radius R as it rotates from the origin 0 to the position P, the centre of the spherical surface being C.

If OC=R=PC, ACP=ACO=$\theta$ and OA=AP=r then R=(r/sin $\theta$).

In this way, a surface of any radius R can be generated by selecting θ computed as $\sin^{-1}(r/R)$.

If the surface 11 is convex, as shown in FIG. 2, the intersection of the two rotation axes 13 and 14 at C is to the right of 0, if it is concave the intersection C is to the left, and if the radius of the surface 11 is infinity (ie it is a plane surface) the rotation axes 13, 14 are parallel with C at infinity. If a hyperhemisphere (more than hemisphere) is required, 2θ should be less than 180° and would be, for example, 120° giving a maximum practical value of θ as 60°. In this case, therefore, θ normally lies in the range 0 to ±60°. In most cases, however, θ will be less than 40°.

The range of values of r is set on the large limit by the maximum radius of finished workpiece to be considered. A circular flat plate of diameter 100 mm would require AP to be 25 mm. The circle 16 must encompass the extreme edge of the workpiece, but in the case of smaller workpieces can go beyond the edge of the workpiece.

It will be seen that the circle 16 always passes through 0.

Figure 3:
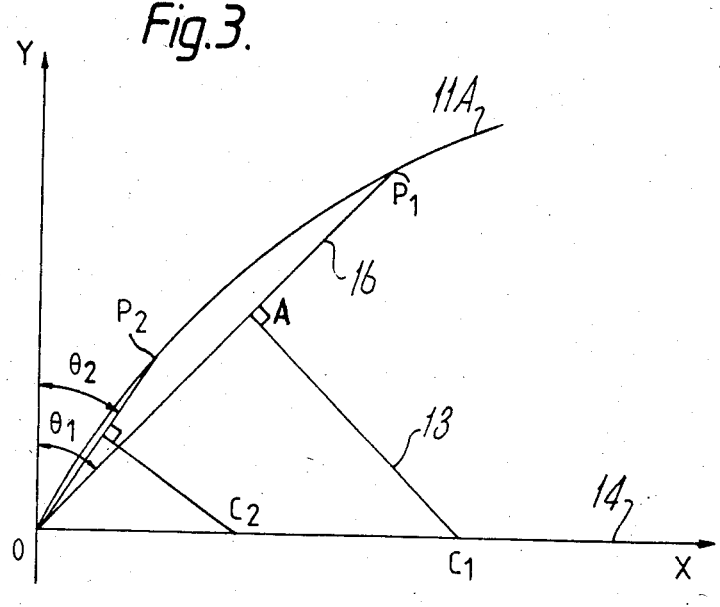

An aspherical surface 11 is illustrated in FIG. 3. An aspherical surface is characterised by the fact that separate elemental areas have different centres of curvature C. If the surface is a solid of revolution, all the centres of curvature will lie on the X axis and the solid may be regarded as made up of an assembly of spherical surfaced disks whose centres lie on the X axis and of appropriate radius determined by the ordinate of P which is the point at which the circle 16 of radius r of the tool intersects the desired surface.

Figure 4:
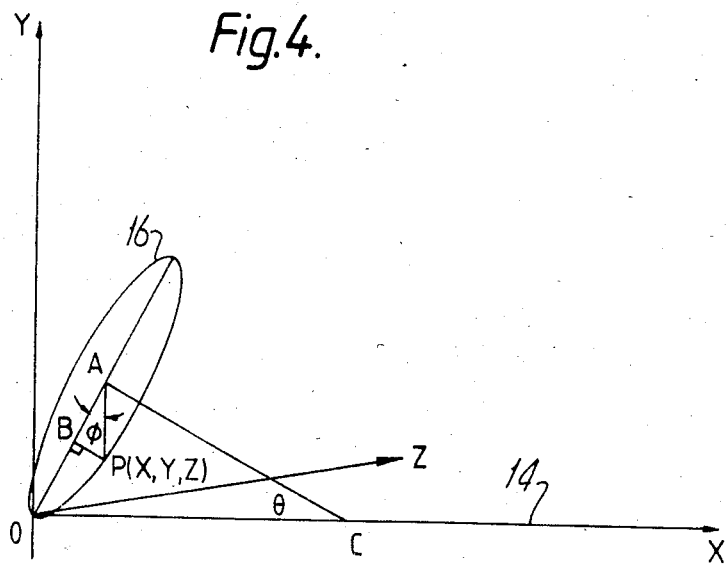

FIG. 3 shows two points $P_1$ and $P_2$ on the aspherical surface 11. The component of displacement of P in the X direction is brought about by a rotation $\phi$ (see FIG. 4) of the point P of tool 12 about its rotation axis 13 (AC). In one complete rotation of P the point P traces the (base) circle 16, centre A, of a right circular cone with its apex at C and semi angle θ as shown in FIG. 4.

Taking as before $OA = r$ and dropping a perpendicular PB on to OA, we see that $BA = r \cos \phi$ and $OB = r(1 - \cos \phi)$.

Therefore the coordinates of P (x, y, z) are $$x = r(1 - \cos \phi) \sin \theta$$

$$y = r(1 - \cos \phi) \cos \theta$$

and $$z = r \sin \phi$$

Thus in order to generate a desired elemental circular section of the aspherical surface 11, by rotation of the workpiece 10 about the X axis, say at point P, the axis 13 is titled angle θ about 0 so that the locus of the point P of the tool 12 intersects $P_1$ for angular position $\phi_1$.

The values of $\phi$ and θ for a given r can be computed given the Cartesian equation of the aspheric surface required.

Continuous generation of an aspheric surface can be performed by fast rotation of the workpiece 10 about the X axis and slow simultaneous changes of θ and $\phi$ and this provides the basis of the preferred method and apparatus of the invention.

For optical applications of aspheric surfaces which are solids of revolution, the maximum departure from the nearest fitting sphere is usually small, involving a change in θ of less than ±1°.

Figure 5:
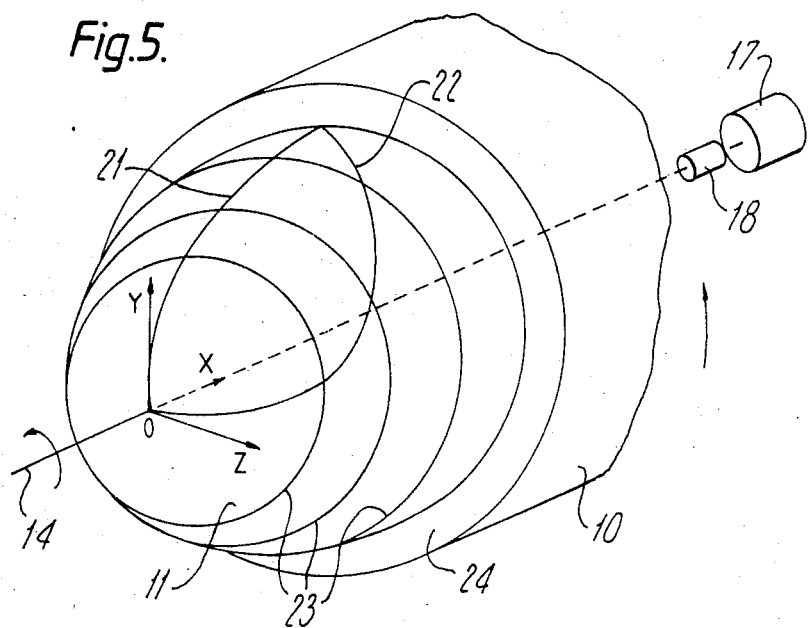
FIG. 5 illustrates in diagrammatic form the locii followed by a surface forming tool in forming an aspheric surface in accordance with the known arrangement and the present invention, and, FIG. 6 illustrates in diagrammatic form an apparatus for carrying out the method of the present invention.

FIG. 5 shows the workpiece 10 and the aspheric surface 11 cut on the workpiece 10, the workpiece 10 being rotated by a motor 17 and mounted in a bearing 18.

Figure 1:
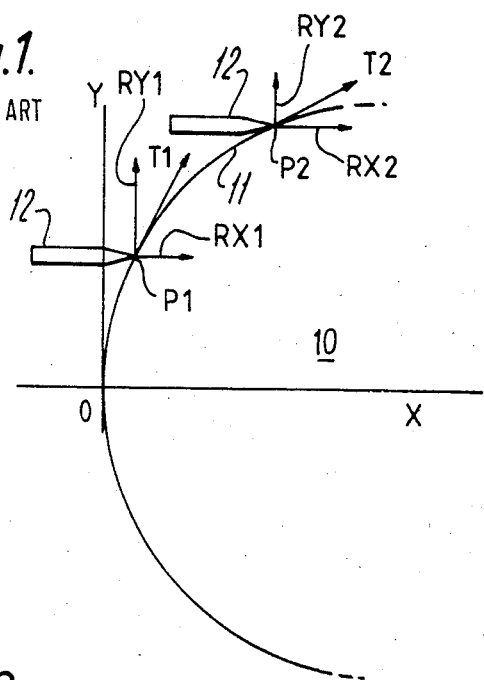

The pole of the aspheric surface is illustrated at 0 and the path of the cutting tool used to produce the aspheric surface according to the prior art method of FIG. 1 is illustrated at 21; the path of the cutting tool used in the method according to the present invention is illustrated at 22. Lines 23 are provided to show in diagrammatic form the shape of the aspheric surface.

The asphericity of the aspheric surface 11 and the lip 24 between the aspheric surface and the uncut part of the workpiece 10 are exaggerated for clarity.

Figure 6:
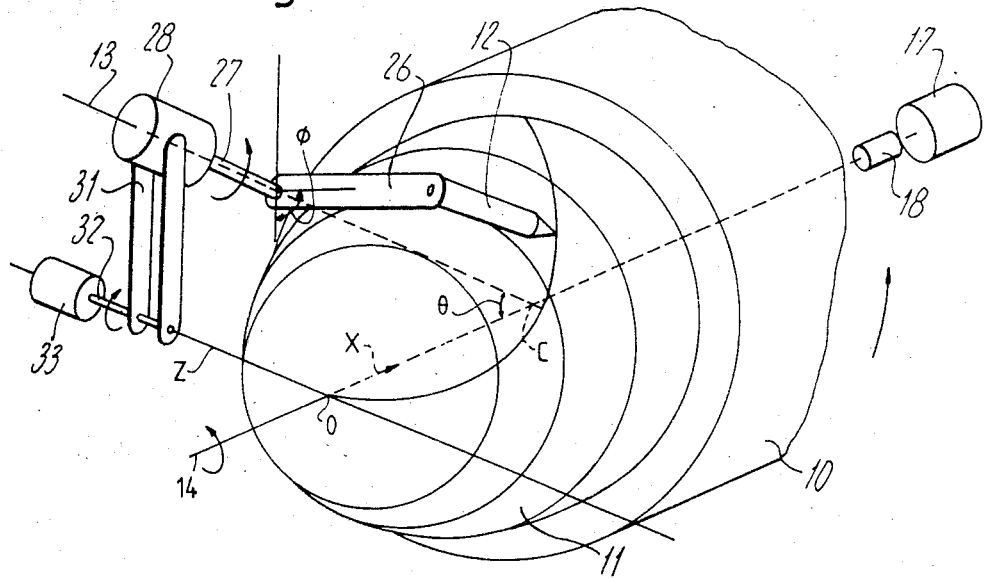

FIG. 6 illustrates in diagrammatic form apparatus for producing an aspheric surface. As before, the workpiece 10 is rotated about axis 14 by motor 17 and is journalled in bearings 18. The workpiece is rotated at high speed. A cutting tool 12 is provided in the form of a tool projecting from one end of an arm 26, the opposite end of the arm 26 being mounted to rotate with a shaft 27 rotated by a motor 28, the shaft 27 being coaxial with axis 13. The motor 28 is mounted to arms 31 which are connected at their lower end to rotate with shaft 32, the shaft 32 being driven by motor 33. Shaft 32 is mounted so as to be coaxial with the Z axis.

In use, therefore, the cutting tool 12 is positioned at the origin 0, in which case the angle $\phi$ is zero.

The workpiece 10 is rotated at high speed by the motor 17 and the motor 28 rotates the shaft 27 so as to increase the angle of $\phi$. This rotation is slow so that the point P of the tool 12 cuts round the periphery of the workpiece 10. In practice, for an increase in $\phi$ of plus 1° the workpiece 10 will rotate 200 times.

At the same time, to give the desired asphericity to the surface, the angle θ is changed by rotation of the shaft 32 by motor 33. Once again, this rotation of shaft 32 is very limited and as has been described about in the case of optical components, during the complete operation, shaft 32 may only rotate to the extent of 1°.

Clearly, the motors may drive the shafts through reduction gearing, and this would be particularly applicable to motors 33 and 28. Motors 33 and 28 are preferably electric stepping motors which can be very accurately controlled by computer with respect to their rotation but motor 17 can normally be any high speed electric motor.

Although FIG. 6 shows the production of a convex surface, changing the angles will allow production of a concave aspheric surface as referred to earlier.

It will be understood therefore that by means of the use of accurately controllable electric motors, and accurately made rotational bearings, the aspherical surface may be accurately cut.

The invention is not restricted to the details of the foregoing examples.

I claim:

1. A method for producing an aspherical surface (11) on a workpiece (10) comprising: rotating the workpiece about a first axis (14), rotating a single point contact surface forming member (12) about a second axis (13) without linear translational movement more slowly than the rotation of the workpiece and at a radial distance from the second axis to form a surface on the workpiece, the second axis and first axis meeting at a point (C) and being at an acute angle (θ) with respect to one another, and progressively rotating without linear translational movement the second axis with respect to the first axis about a third axis (Z) passing through a pole (0) of the aspherical surface so that the point moves along the first axis, the acute angle between the first and second axes changes, and the surface forming member traverses a non-planar path of movement (22).

2. A method for producing an aspherical surface (11) on a workpiece (10) comprising: rotating the workpiece about a first axis (14), rotating a single point contact surface forming member (12) about a second axis (13) without linear translational movement more slowly than the rotation of the workpiece and at a radial distance from the second axis, the circumference of a locus traced out by the surface forming member at all times passing through a pole (0) of the aspherical surface; and progressively rotating without linear translational movement the plane of said locus about a third axis (Z) passing through the pole of the apsherical surface such that the surface forming member traverses a non-planar path of movement (22) to form an aspherical surface on the workpiece.

3. Apparatus for producing an aspherical surface (11) on a workpiece (10) comprising: means for mounting a workpiece, said mounting means including means (17, 18) to rotate the workpiece about a first axis (14), means (26) for mounting a single point contact surface forming member, a single point contact surface forming member (12), means (28) for rotating the single point contact surface forming member about a second axis (13) more slowly than the rotation of the workpiece and at a radial distance from the second axis without linear translational movement, the second axis and the first axis being arranged to meet at a point (C) and lying at an acute angle ($\theta$), and means (31-33) for progressively rotating the second axis relative to the first axis without linear translational movement about a third axis (Z) passing through a pole (0) of the aspherical surface during the surface forming operation so that said point moves along the first axis, the angle between the first and second axes changes, and the surface forming member traverses a non-planar path of movement (22), thereby to produce an aspherical surface on the workpiece.

4. Apparatus for producing an aspherical surface (11) on a workpiece (10) comprising: means for mounting a workpiece, means (17, 18) for rotating said workpiece about a first axis (14), means (26) for mounting a single point contact surface forming member, a single point contact surface forming member (12), means (28) for rotating the surface forming member about a second axis (13) without linear translational movement more slowly than the rotation of the workpiece and at a radial distance from the second axis to thereby trace out a locus, the circumference of the locus at all times passing through a pole (0) of the aspherical surface, and means (31-33) for progressively rotating, without linear translational movement, the plane of said locus about a third axis (Z) passing through the pole of the aspherical surface such that the surface forming member traverses a non-planar path of movement (22) to form an aspherical surface on the workpiece.

5. Apparatus as claimed in claim 4 in which the means for rotating the surface forming member about a second axis and the means for rotating the plane of said locus about said predetermined point comprise electric stepping motors.

* * * * *